United States Patent [19]
Johnson et al.

[11] Patent Number: 5,905,606
[45] Date of Patent: May 18, 1999

[54] HIGH-PERFORMANCE DISK DRIVE LIMIT STOP EMPLOYING ENCAPSULATED VISCO-ELASTIC MATERIAL

[75] Inventors: Brad Vaughn Johnson, Santa Clara; Kirk Barrows Price, San Jose, both of Calif.

[73] Assignee: International Business Machines Corporation, Armonk, N.Y.

[21] Appl. No.: 08/902,448

[22] Filed: Jul. 29, 1997

[51] Int. Cl.⁶ .................................................. G11B 5/54
[52] U.S. Cl. ............................................................ 360/105
[58] Field of Search .............................. 360/105, 97.01, 360/98.01, 106

[56] References Cited

U.S. PATENT DOCUMENTS

| | | | |
|---|---|---|---|
| 4,603,363 | 7/1986 | Rickert et al. | 360/97 |
| 4,644,435 | 2/1987 | Nemoto et al. | 360/133 |
| 4,716,482 | 12/1987 | Walsh | 360/106 |
| 4,816,315 | 3/1989 | Downey | 428/151 |
| 4,949,206 | 8/1990 | Phillips et al. | 360/106 |
| 5,365,389 | 11/1994 | Jabbari et al. | 360/105 |
| 5,402,290 | 3/1995 | Daniel | 360/106 |
| 5,455,726 | 10/1995 | Liu | 360/106 |
| 5,459,359 | 10/1995 | Umehara | 360/105 |
| 5,523,912 | 6/1996 | Koriyama | 360/106 |
| 5,627,701 | 5/1997 | Misso et al. | 360/106 |
| 5,715,119 | 2/1998 | Williams et al. | 360/105 |

FOREIGN PATENT DOCUMENTS

| | | |
|---|---|---|
| 4-149871 | 5/1992 | Japan . |
| 8-87842 | 4/1996 | Japan . |

OTHER PUBLICATIONS

"Double–Ended Spring Crash Stop With Offset For Disk Files", IBM Technical Disclosure Bulletin, vol. 32 No. 12, May 1990, pp. 171–172.

*Primary Examiner*—Jefferson Evans
*Attorney, Agent, or Firm*—Noreen A. Krall

[57] ABSTRACT

A limit stop for a magnetic storage system having a combination of visco elastic inner core and a thin walled outer shell enclosing the visco-elastic material, and a method of manufacturing the same. The thin wall is hermetically sealed to isolate the inner core material and eliminate the possibility of contamination to the disk drive interior. The visco-elastic inner core has the properties of very good energy dissipation, while the outer shell provides high dimensional control and stability.

14 Claims, 8 Drawing Sheets

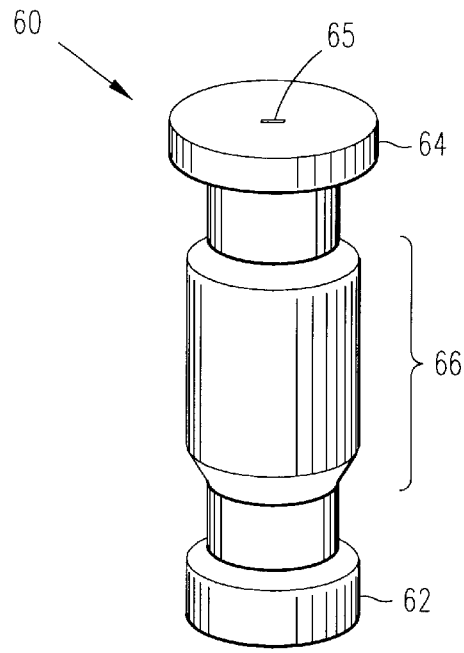
FIG. 3A
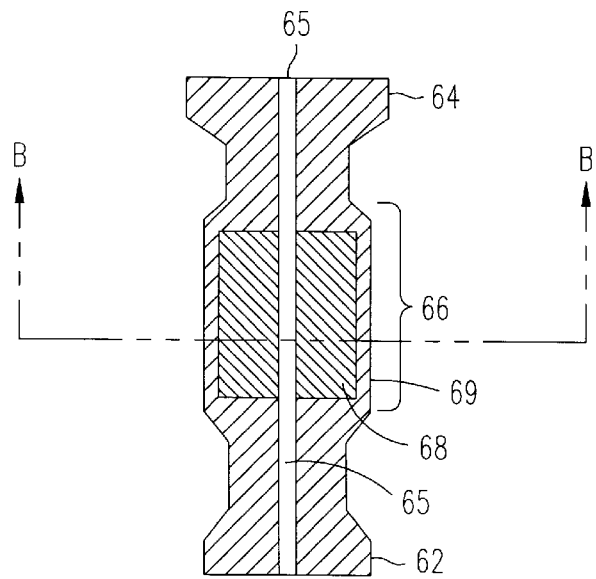
FIG. 3B
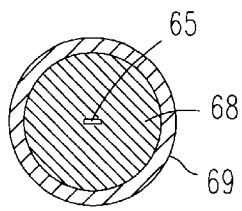
SECTION B-B  FIG. 3C

HIGH-PERFORMANCE DISK DRIVE LIMIT STOP EMPLOYING ENCAPSULATED VISCO-ELASTIC MATERIAL

BACKGROUND OF THE INVENTION

1. Field of the Invention

This invention relates in general to disk drives, and in particular to limit stops in the disk drives whose function is to limit the extent of actuator radial motion to define the usable radius of the disk surface and to protect the suspension and slider from damage due to contact with the disk stack hub at the inner diameter of the disk or due to running off the disk surface at the outer diameter of the disk.

2. Description of Related Art

Moving magnetic storage devices, especially magnetic disk drives, are the memory devices of choice. This is due to their expanded non-volatile memory storage capability combined with a relatively low cost.

Magnetic disk drives are information storage devices which utilize at least one rotatable magnetic media disk having concentric data tracks defined for storing data, a magnetic recording head or transducer for reading data from and/or writing data to the various data tracks, a slider for supporting the transducer in proximity to the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air-bearing, generated by the rotating disk.

Alternatively, the transducer may operate in contact with the surface of the disk. Thus the suspension provides desired slider loading and dimensional stability between the slider and an actuator arm which couples the transducer/slider/ suspension assembly to the actuator. The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks. The actuator may include a single arm extending from a pivot point, or alternatively a plurality of arms arranged in a comb-like fashion extending from a pivot point. A rotary voice coil motor (vcm) is attached to the rear portion of the actuator arm or arms to power movement of the actuator over the disks.

The vcm located at the rear portion of the actuator arm is comprised of a top plate spaced above a bottom plate with a magnet or pair of magnets therebetween. The vcm further includes an electrically conductive coil disposed within the rearward extension of the actuator arm and between the top and bottom plates, while overlying the magnet in a plane parallel to the magnet. In operation, current passes through the coil and interacts with the magnetic field of the magnet so as to rotate the actuator arm around its pivot and thus positioning the transducer as desired.

The magnetic media disk or disks in the disk drive are mounted to a spindle. The spindle is attached to a spindle motor which rotates the spindle and the disks to provide read/write access to the various portions on the concentric tracks on the disks.

The actuator in the disk drive must be capable of a sufficient range of motion so that the transducer/slider combination attached to the suspension can access the maximum usable area of the disk surface to provide the most efficient use of the magnetic storage media and thus achieve the high data density desirable in data storage devices. Circumferential data tracks on the disk are written in a band extending radially from as far to the outer diameter of the disk (OD) as allowed by the necessity of keeping the entire slider over the disk and as far to the inner diameter of the disk (ID) as allowed without the slider or the suspension contacting the spindle on which the disk is mounted.

When the disk drive is not in operation, the disks are not rotating so that the air-bearing that supports the slider during operation is no longer provided. In the stopped condition, the slider rests in contact with the disk surface. When the drive is started, the slider stays in sliding contact with the disk surface until the disk achieves sufficiently high radial velocity to provide the air bearing that supports the slider in the operating condition. When the disk drive is shut down, the actuator locates the slider at the start/stop zone and then the spindle motor is turned off causing the disk or disks to stop rotating, resulting in the slider or sliders contacting the disk when the air-bearings can no longer support their load. The surface of the disks in the start/stop zone are usually specially textured to provide a low sticking and high durability interface, resulting in easy starting and low wear.

In the present art, a common practice reserves a radial band approximately the width of the slider at the ID of the available disk area for use as a start/stop zone. In normal operation, the actuator positions the transducer/slider/ suspension combination radially with respect to the disk as described above. The inner and outer radial limits of the slider/suspension combination are established by mechanical limit stops which constrain motion of the actuator positioning arm where the suspension or suspensions are mounted. These limit stops are located near the rearward extensions of the actuator arm. The ID limit stop limits actuator radial motion to define the innermost radius of the disk surface that can be accessed by the slider without danger of contact with the disk spindle. The OD limit stop limits actuator radial motion to define the outermost usable radius of the disk surface that can be accessed by the slider without danger of the slider running off the flat surface at the OD edge of the disk. The inner and outer radial limits of the slider/suspension combination with respect to the disk surface are required for safely restricting the radial position in case of drive electronics failure and to establish reference radii on the disk to provide information for recovery from a failure.

Because of the high density of data storage on the disks in a file and to maximize the disk area available for user data, it is important to minimize the radial distance over the disk required to decelerate and stop the sliders during impact of the actuator with the limit stops. Equally important, the vibration of the slider/suspension combination induced by rapid deceleration of the actuator assembly on impact with the limit stops must be minimized to prevent damage to the slider or the disk caused by intermittent contacts. In the prior art, these requirements for effective limit stop design have been addressed and will be described briefly.

One example of a limit stop is described in U.S. Pat. No. 4,949,206 issued to Phillips et al. This patent describes a limit stop comprised of a pin fabricated from spring material such as steel with a central generally cylindrical section formed of elastomeric material such as rubber or urethane that encircles the steel section. Another example of a limit stop is described in U.S. Pat. No. 5,523,912 issued to Koriyama. This patent describes a limit stop design in which shaped holes or recesses in the rearward extensions of the actuator arm are filled with elastomer material. Another example of a limit stop is described in U.S. Pat. No. 4,716,482 issued to Walsh. This patent describes a limit stop which includes a stainless steel rod or pin which is insert molded into a jacket made from plastic or thermoplastic elastomer material. This thermoplastic jacket is provided with journals at its ends such that the axis of the steel rod is eccentric with respect to the common axis of these journals.

Many other approaches to limit stop design exist in the prior art, all of which are directed to 1) keeping crash impact deflections as small as possible to maximize the disk area available for data storage and 2) keeping crash impact deceleration levels as low as possible to provide the highest possible margin for slider and/or disk damage from intermittent contacts. A common approach is to completely form the limit stops of soft elastic or elastomeric materials to dissipate impact energy efficiently while limiting the impact deflections.

The limit stops and materials used therein described in the prior art have several disadvantages which severely constrain their utility in practice. Elastomer or visco-elastic material parts generally have poor dimensional control and geometric precision requiring large tolerances which wastes valuable disk space. Dimensional stability of parts formed from these materials change with time, temperature and loading. Limit stops formed of these materials tend to adhere to the actuator when loaded against it for long periods (sticky limit stops). The materials generally have high outgassing characteristics leading to contamination of the file components which can result in serious corrosion or stiction problems.

It therefore can be seen that there is a need for a limit stop that can be fabricated within well-defined mechanical tolerances, minimizes impact deflections, limits impact deceleration levels, has good dimensional stability with time, temperature and loading, and has low outgassing characteristics.

SUMMARY OF THE INVENTION

To overcome the limitations of the background art described above, and to overcome other limitations that will become apparent upon reading and understanding the present specification, the present invention discloses an improved limit stop and method of fabrication of the limit stop for use in disk drives. It is one object of the invention to provide an improved limit stop that has the property of very good energy dissipation, thereby resulting in low deceleration levels with small displacements during impact. It is a further object of the invention to provide a limit stop configuration with high dimensional control and stability. It is still a further object of the present invention to provide a limit stop formed from a material that will not contaminate the disk drive interior.

In accordance with these objects, the present invention is a limit stop for magnetic storage systems comprising a combination of visco-elastic material inner core and a thin walled outer shell enclosing the visco-elastic material. The thin walled outer shell is formed of a plastic material, and is hermetically sealed to isolate the inner core material and eliminate the possibility of contamination to the disk drive interior. The visco-elastic inner core has the property of very good energy dissipation, while the outer shell provides high dimensional control and stability.

In a preferred embodiment the limit stop is a generally cylindrical rod or pin which is comprised of a central coaxial cylinder of visco-elastic material which is encapsulated by a thin layer of plastic. In this embodiment, the cylindrical rod or pin is insertably retained between the top and bottom of the file housing.

In one embodiment, the limit stops of the present invention are fabricated by use of a molding process, whereby the inner core and the outer shell are formed sequentially about a carrier strip.

The limit stops of the present invention alternatively are fabricated by inserting a generally cylindrical supporting pin formed of metal or hard plastic in the center and coaxial with a generally cylindrical mold in which a visco-elastic material is injected. A hollow 2-piece thermoplastic shell is fitted over the short visco-elastic cylinder on the supporting pin. The two pieces of the hollow plastic shell are then bonded together to form a hermetic seal encapsulating the visco-elastic material.

In normal operation, the actuator is controlled to move the suspension/head assembly in a generally radial direction over the disk surface to the desired track location on the disk. In a number of normal operations such as startup and shutdown, the actuator is driven to the full ID and/or OD limits. The advantage of the present invention over the prior art is that the impacts at the limit stops due to these operations result in smaller displacements due to limit stop compression while still resulting in acceptable deceleration values to protect the file from slider and disk damage. In these events, the high energy dissipation qualities of the visco-elastic limit stop material of this invention reduces the possibility of impact damage due to excessive decelerations of the suspension/slider combination.

Unlike the visco-elastic material limit stops found in the prior art, the critical dimensions of the limit stops of this invention can be manufactured to tight tolerances due to the encapsulating outer shell of plastic. The ability to maintain the critical dimensions within tight tolerances for long times under high loads and at elevated temperatures is greatly increased by encapsulation with a hard plastic shell.

BRIEF DESCRIPTION OF THE DRAWINGS

FIGS. 3A, 3B and 3C are a perspective view, a side sectional view and a mid-section view B—B of the limit stop of the present invention;

DETAILED DESCRIPTION OF THE PREFERRED EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
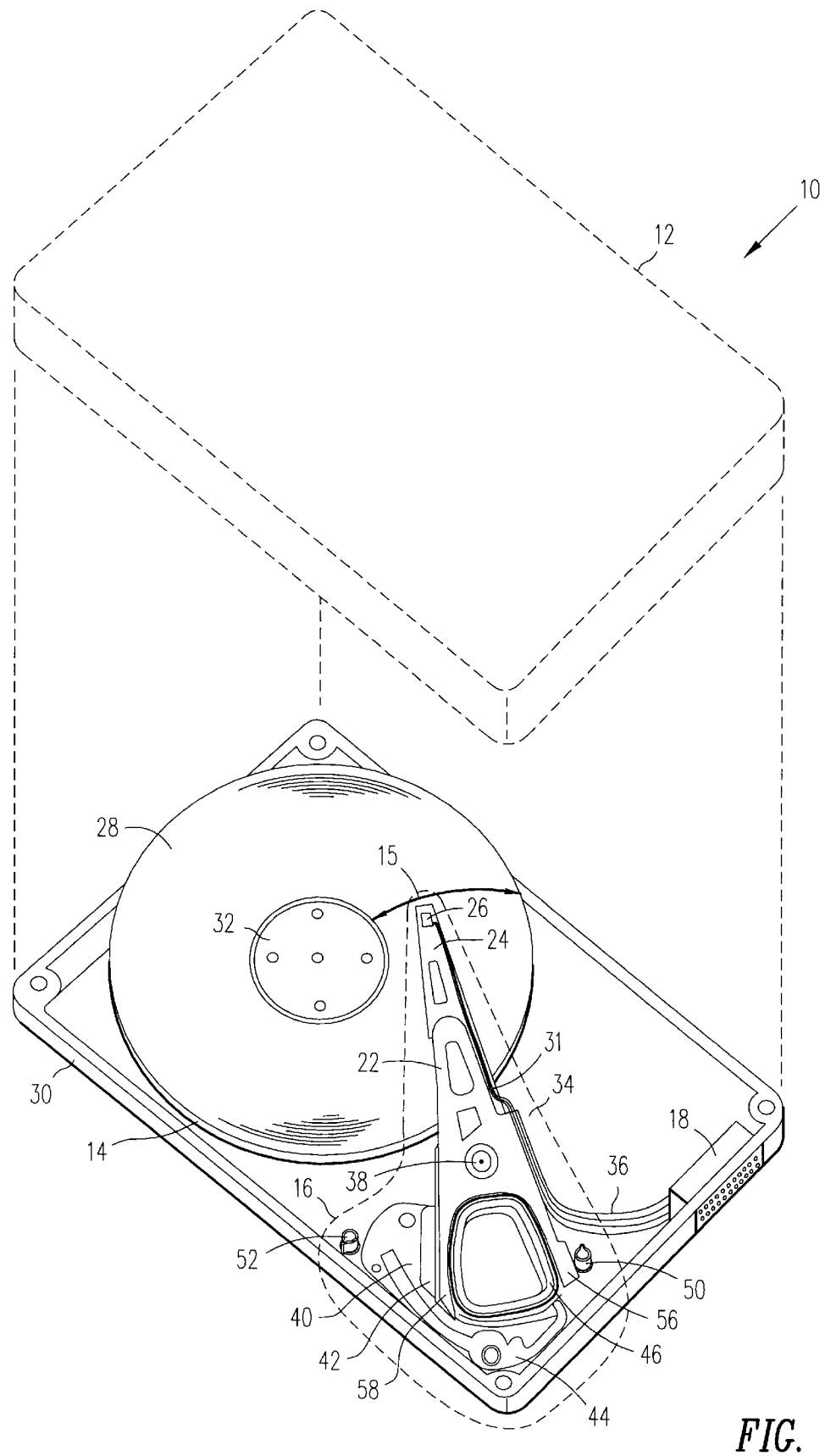
FIG. 1 is a plan view of the disk drive of the present invention generally illustrating the relative placement of the disks, actuator and limit stops of the present invention.

FIG. 1 shows a disk drive system designated by the general reference number 10. The lid 12 of the disk drive 10 is shown exploded and in phantom. In operation, the lid would be disposed atop of the housing 30.

The disk drive 10 comprises one or more magnetic disks 14. The disks 14 may be conventional particulate or thin film recording disks, which are capable of storing digital data in concentric tracks. In a preferred embodiment, both sides of the disks 14 are available for storage, and it will be recognized by one of ordinary skill in the art that the disk drive 10 may include any number of such disks 14.

The disks 14 are mounted to a spindle 32. The spindle 32 is attached to a spindle motor which rotates the spindle 32 and the disks 14 to provide read/write access to the various portions of the concentric tracks on the disks 14.

An actuator assembly 16, in accordance with the present invention is indicated by the dashed lines in FIG. 1. The actuator assembly 16 includes a positioner arm 22, and a suspension assembly 24. The suspension assembly 24 includes a slider/transducer assembly 26 at its distal end. Although only one slider/transducer assembly 26 of the suspension assembly 24 is shown, it will be recognized that the disk drive 10 has one slider/transducer assembly 26 for each side of each disk 14 included in the drive 10. The positioner arm 22 further comprises a pivot 38 around which the positioner arm 22 pivots.

The disk drive 10 further includes a read/write chip 34. As is well known in the art, the read/write chip 34 cooperates with the read/write transducer on the slider assembly 26 to read or write to the disks 14. A flexible printed circuit member 36 carries digital signals between the chip 34 and a connector pin assembly 18 which interfaces with the external signal processing electronics. One or more electrical conductors 31 are routed along the pivot arm 22 and suspension 24 to carry electrical signals to and from the read/write transducer on the slider 26.

The main function of the actuator assembly 16 is to move the positioner or actuator arm 22 around the pivot 38. Part of the actuator assembly 16 is the voice coil motor (vcm) which comprises the vcm bottom plate 40, the magnet 42 and the vcm top plate (not shown to expose the rest of the actuator assembly) in combination with the actuator coil 46. Current passing through the coil 46 interacts with the magnetic field of the magnet 42 to rotate the positioner arm 22 and suspension assembly 24 around the pivot 38, thus positioning the read/write transducer assembly on the slider 26 as desired. Motion of the actuator arm over the surface of the disk is shown by arrow 15. Also shown is a latching mechanism 44, known in the art, which serves to secure the position of the actuator positioner arm 22 when the disk drive system 10 is not in operation.

Limit stops 50,52, in accordance with the present invention, are located as shown in FIG. 1. The ID limit stop 50 is positioned to limit motion of the rearward extension of the actuator positioning arm 56 thus limiting the innermost radial position of the sliders 26 relative to the disk surface 28. The OD limit stop 52 is positioned to limit motion of the rearward extension of the actuator positioning arm 58 thus limiting the outermost radial position of the sliders 26 relative to the disk surface 28. The general positioning of the ID limit stop 50 and the OD limit stop 52 illustrated in FIG. 1 is known and practiced in the art.

Figure 2A:
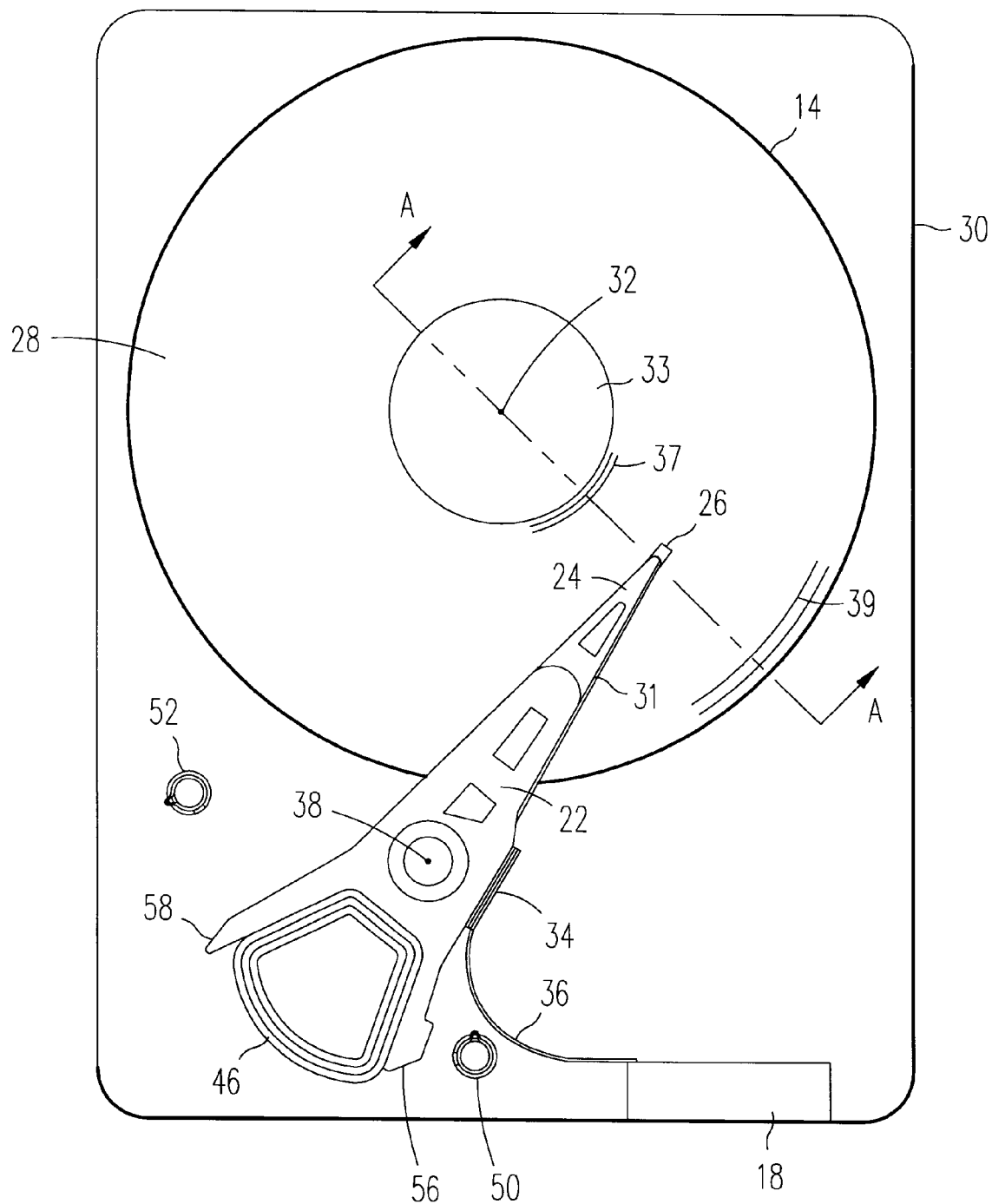
FIG. 2A is a plan view of the actuator and limit stops relative to the disk illustrating the important ID and OD constraints of crash deflection.
Figure 2B:
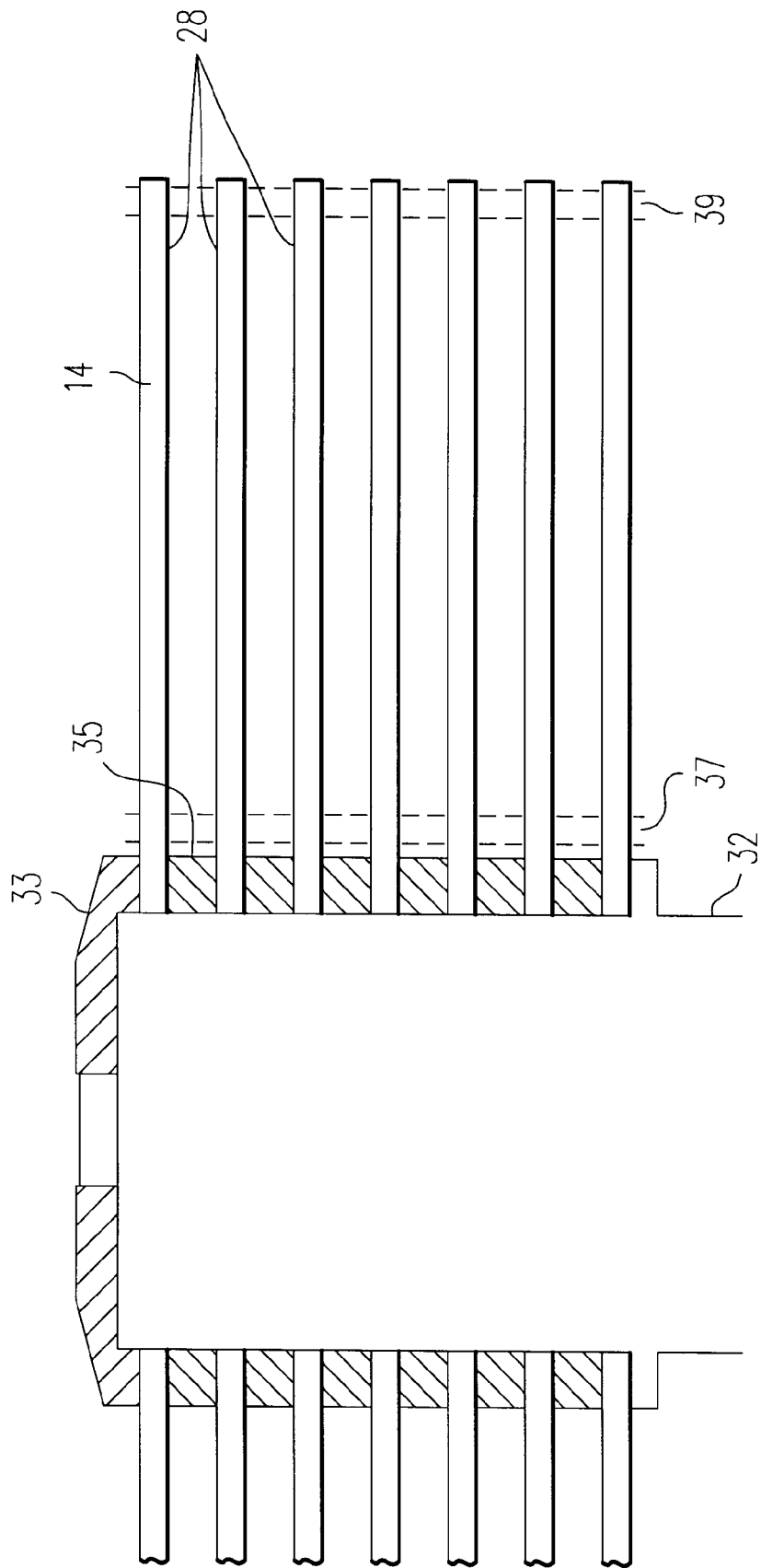
FIG. 2B is a section view A—A of the disk stack illustrating the spacer ring geometry.

FIG. 2A is a plan view illustrating the important ID and OD constraints on the slider 26 radial position relative to the disk surface 28. The disks 14 are mounted on a drive motor spindle 32 by the clamping action of a clamp ring 33 having a outer diameter slightly larger than the diameter of the inner hole of the disks 14. FIG. 2B is a section view through A—A in FIG. 2A illustrating how when a disk drive system 10 has more than one disk 14, spacer rings 35 of generally equal diameter to the clamp ring 33 are placed between the disks 14 in a concentric arrangement with respect to the spindle 32 to form a disk stack with disk-to-disk spacing equal to the height of the spacer rings 35. To prevent damage to either the slider 26 or the suspension 24, the slider/suspension combination must be prevented from contacting the clamp ring 33 or spacer rings 35 when maximum actuator positioner arm 22 rotation toward the ID occurs. The function of the ID limit stop 50 is to limit rotation of the actuator positioner arm 22 toward the spindle 32 so as to ensure the suspension 24 or slider 26 does not actually contact the clamp ring 33 or spacer rings 35. Similarly, the maximum rotation of the actuator positioner arm 22 toward the OD of the disk surfaces 28 must be limited to prevent the slider or sliders 26 from being positioned over the OD edge of the disk surface 28 since at this edge the supporting air-bearing will collapse allowing the slider 26 to be damaged by contact with the disk edge. The function of the OD limit stop 52 is to limit rotation of the actuator positioner arm 22 to ensure adequate margin for the slider 26 to maintain a stable air-bearing near the disk OD.

Due to the very rapid accessing capability of high performance disk files, the maximum attainable actuator positioner arm 22 rotation velocity allows impact energies at the ID limit stop 50 and the OD limit stop 52 to reach very high values. The use in the prior art of hard, low compressibility materials as limit stops results in low energy absorption at the impact interface causing the actuator positioner arm 22 to bounce at impact with a very high deceleration rate as the rotation direction reverses. The high deceleration rate can result in high frequency vibration of the suspension 24 resulting in damaging slider 26 to disk surface 28 impacts. The use of softer, compressible materials as limit stops results in lower deceleration rates, but due to the finite deflection of the limit stop material, a wide ID limit stop band 37 and OD limit stop band 39 must be provided at the ID and OD disk radius to provide the necessary safety margin to prevent slider 26 or suspension 24 damage. These bands must be provided on every disk surface in the file, and since these bands cannot be used for data storage, a significant loss of useful data capacity results.

As is known in the art, the use of visco-elastic materials for limit stops can in principle provide a suitable compromise of lower deceleration rates due to good energy dissipation with low deflection. However, poor dimensional stability, high outgassing rates and surface stickiness of visco-elastic materials has prevented general application for this purpose. The present invention provides a structure which overcomes these difficulties.

A limit stop in accordance with the present invention is shown and described with reference to FIGS. 3A–3C. In a preferred embodiment, FIG. 3A illustrates a perspective view of a limit stop, represented here by numeral 60, that is insertable from outside the disk drive 10 for easy assembly. In this embodiment, the limit stop 60 comprises a generally cylindrical shaped outer shell 69 formed of hard plastic material having a bottom end 62 and a top end 64 of unequal radii which fit closely in suitable mounting holes in the bottom cover 30 and the top cover 12 of the disk drive 10 at either the ID limit stop 50 position or at the OD limit stop 52 position. At the generally middle region of the limit stop 60, a generally cylindrical limiter 66 is located. With reference to FIGS. 3B and 3C, it can be seen that limiter 66 is further comprised of an inner visco-elastic core 68 and a thin plastic encapsulating shell 69. The diameters of the bottom end 62 of the limit stop 60 and of the limiter 66 are smaller than the diameter of the top end 64 of the limit stop 60 and limiter 66 so that the limit stop 60 can be easily inserted through a hole (not shown) in the top cover 12 of the disk drive system 10 at either the ID limit stop 50 position or the OD limit stop 52 position. Although the limit stop 60 shown and described herein is generally cylindrically shaped, modifications to the shape may be made without departing from the spirit and scope of the present invention. The method of installing the limit stop described in this embodiment is part of the prior art, and it will be recognized by one familiar with the art that any other suitable means of installing the limit stops can be used.

In a preferred embodiment, annular core 68 is formed from a visco-elastic material selected from the groups consisting of polyacrylate elastomers and polyurethane elastomers. Encapsulating cover 69 is preferably a plastic material. Examples of suitable materials include polyertherimide, polycarbonate or polyurethane. Alternatively, acetal, fluorocarbon, nylon, and polypropylene may be used. In operation, the rearward extensions 56 and 58 of the actuator positioning arm 22 will impact the limiter 66 portion of the limit stops 60 when the actuator is rotated to the ID or OD limits defined to protect the slider 26 or suspension 24 from damage. Still with reference to FIG. 3B, it can be seen that the structure of the preferred embodiment of the limit stop 60 comprises a molded annular core 68 encapsulated in a molded plastic generally cylindrical material 69 that also forms the main body of the limit stop 60. During a limit stop impact, one of the actuator positioning arm extensions 56 or 58 contacts the limit stop 60 at the limiter 66 region at the general location indicated by the section B—B of FIG. 3B. Actuator contact is with the thin plastic encapsulating layer 69 which provides a hard, non-sticky contact interface at the precise position needed to safely limit actuator positioning arm 22 rotation about its pivot 38. At impact, the rotational energy of the actuator positioning arm assembly 22 will be transferred to the limiter 66 region of the limit stop 60. This energy is transferred through the plastic encapsulating layer 69 into the core of visco-elastic material 68 where the energy is rapidly absorbed and dissipated. Because the impact energy is absorbed by the limiter 66, the actuator positioning arm assembly 22 rotation stops at a low deceleration rate with little or no bounce. The low deceleration rate results in minimum vibration of the suspension 24 and slider 26 decreasing the chance of damaging slider-to-disk impacts. The good impact energy absorption and dissipation properties of visco-elastic materials also results in very small compression-induced deflection of the limit stop visco-elastic material 68. This property is an important feature of the present invention which allows low deceleration rates to be achieved at impact with an accompanying small deflection of the limiter 66 region of the limit stop 60. Small deflection of the limiter 66 region has the desired result that the ID stop band 37 and the OD stop band 39 on the disk surfaces 28 can be very narrow compared to the prior art.

The desired properties of low deceleration rate and small compression-induced deflection of the actuator 22 rotation at the limit stops 50 and 52 are optimized by choice of the particular visco-elastic material 68 and by the exact dimensions of the elements of the limiter 66, in particular the thickness of the encapsulating plastic layer 69 and the visco-elastic core material 68.

Figure 4A:
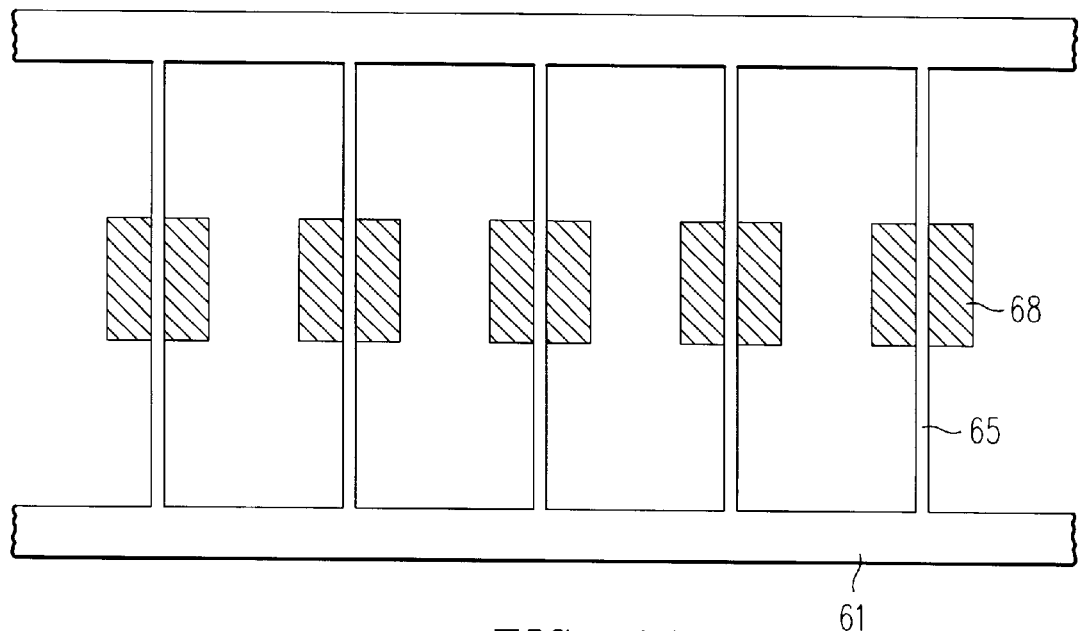
FIG. 4A is a plan view of the mold process carrier strip to form visco-elastic cores for the limit stop.
Figure 4B:
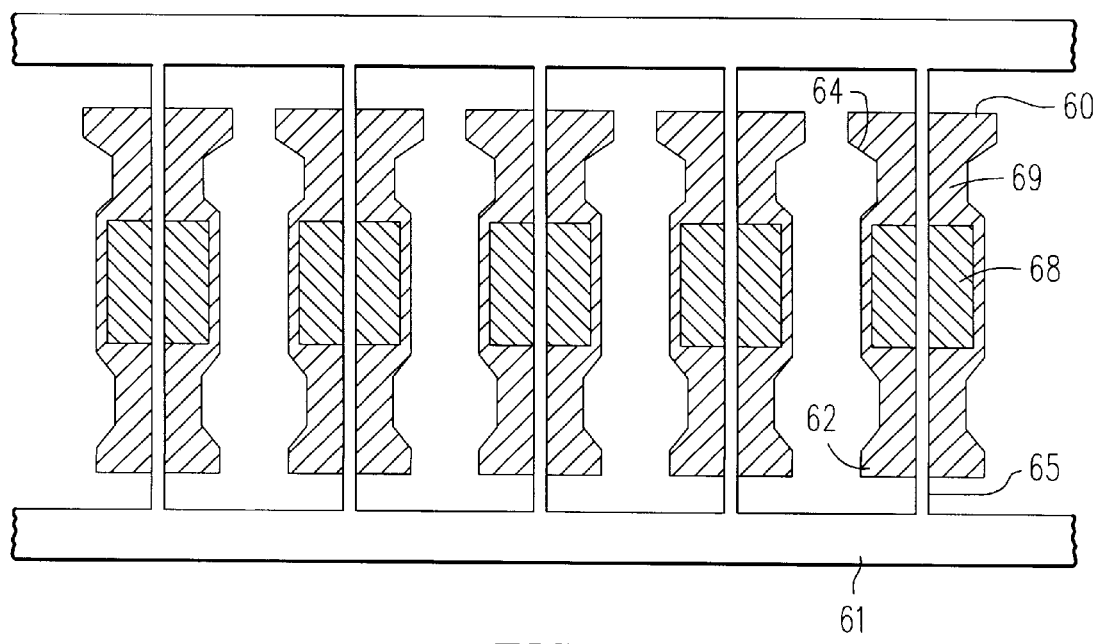
FIG. 4B is a plan view of the mold process carrier strip to form the plastic limit stops encapsulating the visco-elastic cores.

An object of the present invention is to provide a method for fabrication of the preferred embodiment illustrated in FIGS. 3A–3C. The features of the present embodiment that are desired for this invention are that the limit stops 60 can be located in the disk drive system 10 with very high positional accuracy relative to the actuator positioning arm 22, that the limit stops 60 are fabricated with accurate dimensions maintained to tight tolerances, and that the visco-elastic material 68 is hermetically sealed within the plastic encapsulating layer 69. These requirements can be met for the fabrication process herein described for a preferred embodiment. FIG. 4A illustrates the first step of a two-step molding process suitable for mass fabrication of the limit stops of this invention. A carrier frame 61 of thin stainless steel or other suitable material is placed in a mold designed to simultaneously form a plurality of parts, one on each of the connecting strips 65 of the carrier frame 61. The mold for this step is designed to form cylindrical visco-elastic material cores 68 around each of the connecting strips 65. The carrier frame 61 with the molded visco-elastic cores 68 attached is removed from the first mold and placed in a second mold designed to form the generally cylindrical plastic body 69 illustrated in FIG. 4B. As can be seen in the FIG. 4B, the molded plastic material forms the main body of the limit stop 60 and also encapsulates the visco-elastic core 68. The carrier frame 61 is then removed from the second mold and the individual limit stops 60 are separated from the carrier frame 61 by cutting the connecting strips 65 at both ends 62,64 of the limit stops 60.

Figure 5A:
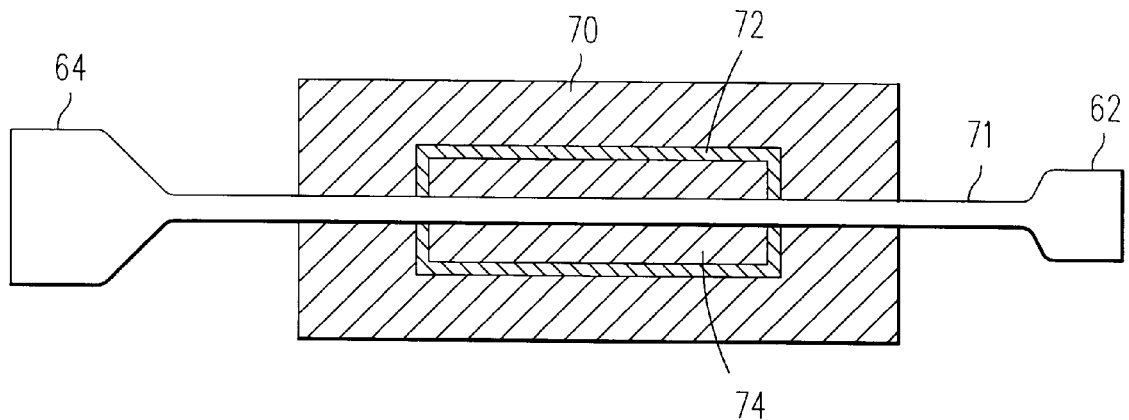
FIGS. 5A and 5B illustrate a second embodiment of the fabrication process.
Figure 5B:
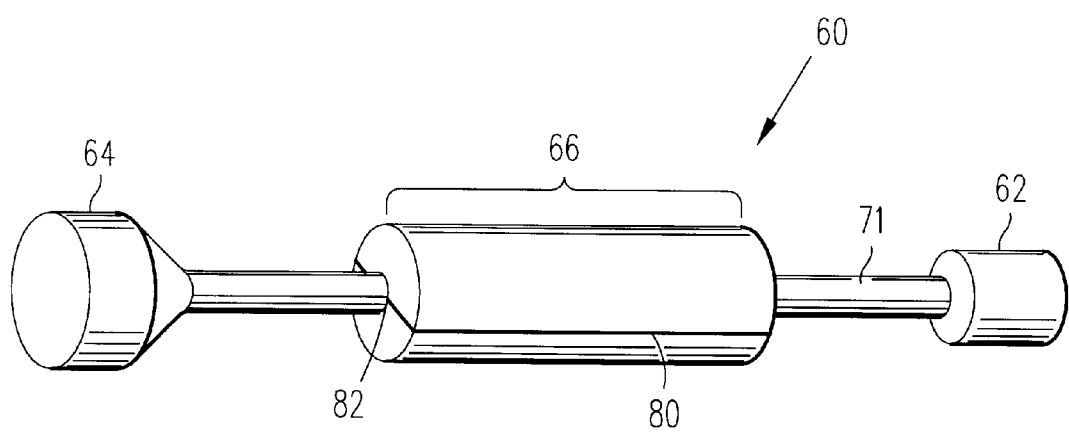

FIGS. 5A and 5B shows an alternative process by which the limit stop 60 of the present invention is formed. Here, a limit stop pin 71 may be turned from steel or other suitable metal or may be turned or molded from a suitable hard plastic material. The limit stop pin 71 is then located centrally in a cylindrical mold 70, in which half of a hollow, two-piece plastic shell 72 has been inserted. The second half of the mold, similarly lined with the second piece of the hollow, two-piece plastic shell is then attached. Soft visco-elastic material can then be injected into the cavity 74 between the limit stop pin 71 and the hollow plastic shell 72 where constrained by the mold it hardens. Following release of this structure from the mold, the two pieces of the plastic shell are bonded together and to the limit pin 71 to form a hermetic seal 80,82 encapsulating the visco-elastic material as illustrated in FIG. 5B. The plastic bonding process can be achieved with ultrasonic welding, solvent bonding or one of several other techniques commonly employed to join plastics.

Figure 6A:
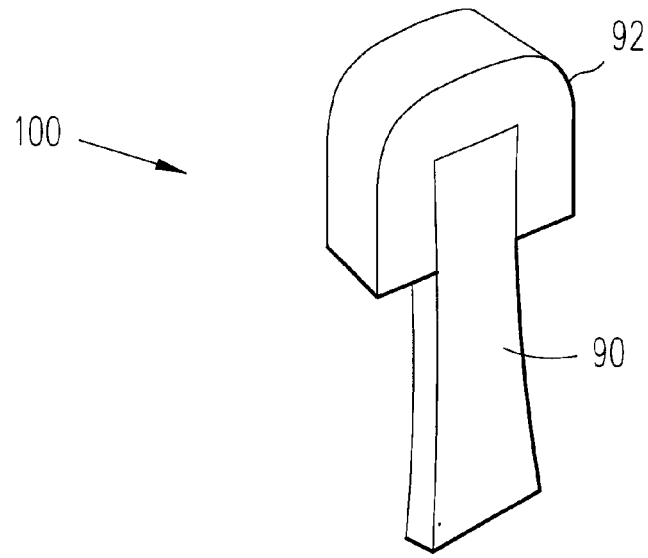
FIGS. 6A and 6B illustrate a plan and sectional view respectively of a second embodiment of the limit stop of the present invention.
Figure 6B:
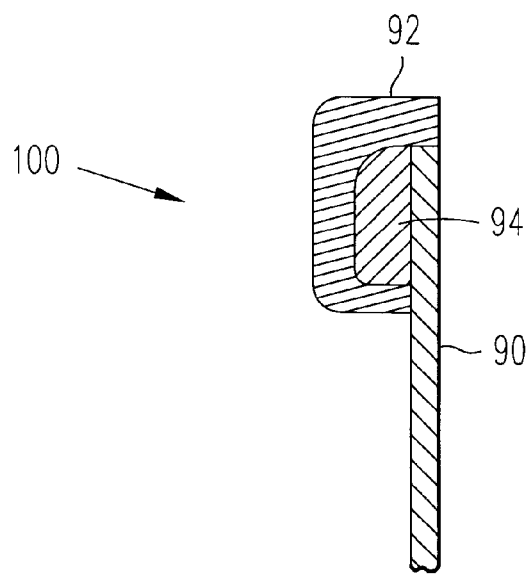

FIGS. 6A and 6B show a first alternative embodiment of a limit stop 100 in accordance with the present invention, the limit stop 100 having a beam type configuration. With reference to FIG. 6A, the limit stop 60 may be comprised of a metal strip 90 which is attachable to housing 30. Encapsulating shell 92 is formed about the metal strip where the actuator assembly 16 contacts the limit stop 100. FIG. 6B shows a cross-sectional view of the limit stop of FIG. 6A, showing the visco-elastic inner core 94 encapsulated within shell 92.

Figures 7A, 7B:
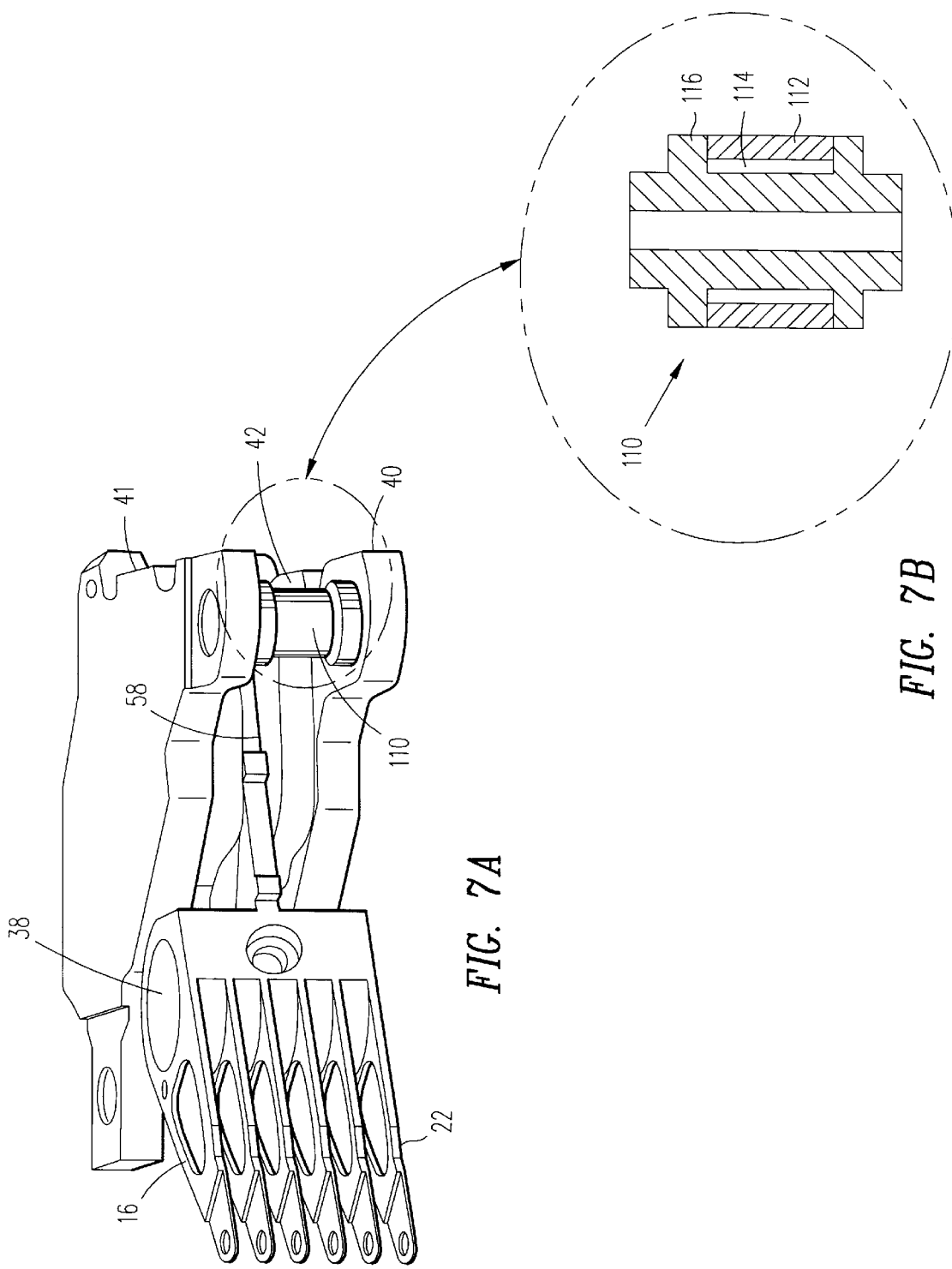
FIGS. 7A and 7B illustrate an alternative placement of the limit stop of the present invention as part of the VCM assembly.

FIGS. 7A and 7B show an second alternative embodiment of a limit stop 110 in accordance with the present invention, showing the limit stop as a collar around the posts of the vcm assembly. FIG. 7A shows the limit stop 110 arranged around the post separating the bottom plate 40 and top plate 41 of the vcm assembly. FIG. 7B is a cross-sectional view of the limit stop 110, wherein the visco-elastic core 114 is located between a shell encapsulant 112 and metal pin 116.

While the preferred embodiments of the present invention have been illustrated herein in detail, it should be apparent that modifications and adaptations to those embodiments may occur to those skilled in the art without departing from the scope of the present invention as set forth in the following claims.

What is claimed is:

1. A disk drive limit stop comprising:
   a rod having a first end and a second end; and
   a limiter formed around said rod between said first end and said second end, said limiter further comprising an inner core molded from a visco-elastic material and a thin outer shell formed of a plastic material completely encapsulating the inner core.

2. The limit stop as claimed in claim 1, wherein said visco-elastic material is selected from the group consisting of polyacrylate elastomers and polyurethane elastomers.

3. The limit stop as claimed in claim 2, wherein said outer shell completely encloses said inner core.

4. The limit stop of claim 3, wherein the rod is substantially cylindrically shaped.

5. The limit stop of claim 3, wherein the rod is substantially rectangular shaped.

6. A disk drive limit stop comprising:
   a carrier strip extending along a central axis of said limit stop; and
   a limiter formed around said carrier strip, said limiter further comprising an inner core molded from a visco-elastic material and a thin outer shell formed of a plastic material completely encapsulating the inner core.

7. A magnetic storage system comprising:
   a disk with a data surface of concentric data tracks;
   a spindle supporting said disk, said spindle shaft for rotating said disk about an axis generally perpendicular to the disk;
   a slider maintained in operative relationship with the data surface when the disk is rotating;
   a transducer attached to the slider for reading data from and writing data to the data surface;
   an actuator for moving the slider generally radially relative to the disk to allow the transducer to access the data tracks, said actuator comprising a forward portion for supporting said slider, a central portion rotatably supported by a rotational shaft through bearings and a v-shaped rearward portion;
   an electronics module for processing data read from and written to the data surface;
   a suspension for connecting said slider to said actuator;
   support means for supporting said spindle shaft and actuator;
   at least one limit stop attachable to said support means proximate to outer sides of said v-shaped rearward portion of said actuator, said limit stop further comprising a rod having a first end and a second end; and
   a limiter formed around said rod between said first end and said second end, said limiter further comprising an inner core molded from a visco-elastic material and a thin outer shell formed of a plastic material completely encapsulating the inner core.

8. The magnetic storage system as claimed in claim 7, wherein said visco-elastic material is selected from the group consisting of polyacrylate elastomers and polyurethane elastomers.

9. The magnetic storage system as claimed in claim 8, wherein said outer shell completely encloses said inner core.

10. The magnetic storage system as claimed in claim 8, wherein the rod is substantially cylindrically shaped.

11. The magnetic storage system as claimed in claim 8, further comprising a voice coil motor assembly providing magnetic current for movement of the actuator, the voice coil motor assembly further comprising a top plate and a bottom plate separated by the rod of the at least one limit stop.

12. A magnetic storage system comprising:
    a disk with a data surface of concentric data tracks;
    a spindle supporting said disk, said spindle shaft for rotating said disk about an axis generally perpendicular to the disk;
    a slider maintained in operative relationship with the data surface when the disk is rotating;
    a transducer attached to the slider for reading data from and writing data to the data surface;
    an actuator for moving the slider generally radially relative to the disk to allow the transducer to access the data tracks, said actuator comprising a forward portion for supporting said slider, a central Portion rotatable supported by a rotational shaft through bearings and a v-shaped rearward portion;
    an electronics module for processing data read from and written to the data surface;
    a suspension for connecting said slider to said actuator;
    support means for supporting said spindle shaft and actuator;
    at least one limit stop attachable to said support means proximate to outer sides of said v-shaped rearward portion of said actuator, said limit stop further comprising a
    a carrier strip extending along a central axis of said limit stop and a limiter formed around said carrier strip, said limiter further comprising an inner core molded from a visco-elastic material and a thin outer shell formed of a plastic material completely encapsulating the inner core.

13. A method for manufacturing an actuator limit stop for a magnetic storage system comprising:
    providing a carrier frame having a first support means, a second support means, and a plurality of carrier strips extending between said first and second support means;
    placing said carrier frame into a mold so that a visco-elastic core may be formed about each of said carrier strips;
    molding a visco-elastic material about each of said carrier strips to form said visco-elastic core;
    placing said carrier frame having molded visco-elastic core into a second mold to form a main body of said limit stop;
    molding a plastic material about said carrier strips, thereby enclosing said visco-elastic core and forming said main body of said limit stop;
    removing said carrier strips from said carrier frame.

14. A method for manufacturing an actuator limit stop for a magnetic storage system comprising:

providing a first half-cylindrically shaped plastic shell having a first end, a second end, and a hollow center portion;

providing a second half-cylindrically shaped plastic shell having a first end, a second end, and a hollow center portion;

placing a limit stop pin into said first half cylindrically shaped plastic shell such that said pin rests along an edge of the shell extending from said first end over said hollow portion and to said second end;

inserting a visco-elastic material into said hollow center portions;

sealing said first plastic shell to said second plastic shell.

* * * * *